United States Patent [19]

Farrell

[11] 4,184,828
[45] Jan. 22, 1980

[54] IMPRINTING MACHINE

[75] Inventor: Bernard T. Farrell, Park Hills, Ky.

[73] Assignee: Advanced Drainage Systems, Inc., Columbus, Ohio

[21] Appl. No.: 898,383

[22] Filed: Apr. 20, 1978

[51] Int. Cl.² .................... B29C 17/00; B29D 23/18
[52] U.S. Cl. .................................. 425/143; 264/284;
    264/286; 264/508; 425/336; 425/385; 425/396;
    425/403; 425/DIG. 40
[58] Field of Search ....... 425/385, 392, 375, DIG. 40,
    425/336, 409, 403, 469, 143, 303, 304, 369, 370,
    383, 396; 264/284, 286, 287, 167, 209, 508, 509

[56] References Cited

U.S. PATENT DOCUMENTS

| | | | |
|---|---|---|---|
| 1,567,766 | 12/1925 | Stacy | 425/409 |
| 2,561,231 | 7/1951 | Rose | 425/385 |
| 2,867,001 | 1/1959 | Lewis et al. | 264/284 |
| 2,953,085 | 9/1960 | Cook | 425/385 |
| 3,577,591 | 3/1968 | Ricards | 425/409 |
| 3,819,778 | 6/1974 | Maroschak | 264/209 |
| 4,028,033 | 6/1977 | Bryant | 425/385 |

FOREIGN PATENT DOCUMENTS 51-47972  4/1976  Japan ........................... 425/403

*Primary Examiner*—James B. Lowe
*Attorney, Agent, or Firm*—Connolly and Hutz

[57] ABSTRACT

Machine for imprinting indicia on thermoplastic corrugated tubing comprises framework with structure connected thereto for guiding tubing along predetermined path of travel. Motivator on framework moves tubing along its path of travel, and imprinting structure mounted adjacent path of travel of tubing functions to selectively move into and out of engagement with exterior surface of tubing. Imprinting structure includes print wheel with spaced apart teeth at periphery thereof arranged to mesh with corrugated tubing when imprinting structure is in engagement therewith. Conductive print type are releasably secured to print wheel at periphery thereof, and heater cartridges function to heat print type. Print wheel is selectively shifted into engagement with exterior surface of corrugated tubing as it moves along its path of travel so that heated print type softens thermoplastic to thereby heat stamp indicia of type onto corrugated tubing.

6 Claims, 3 Drawing Figures

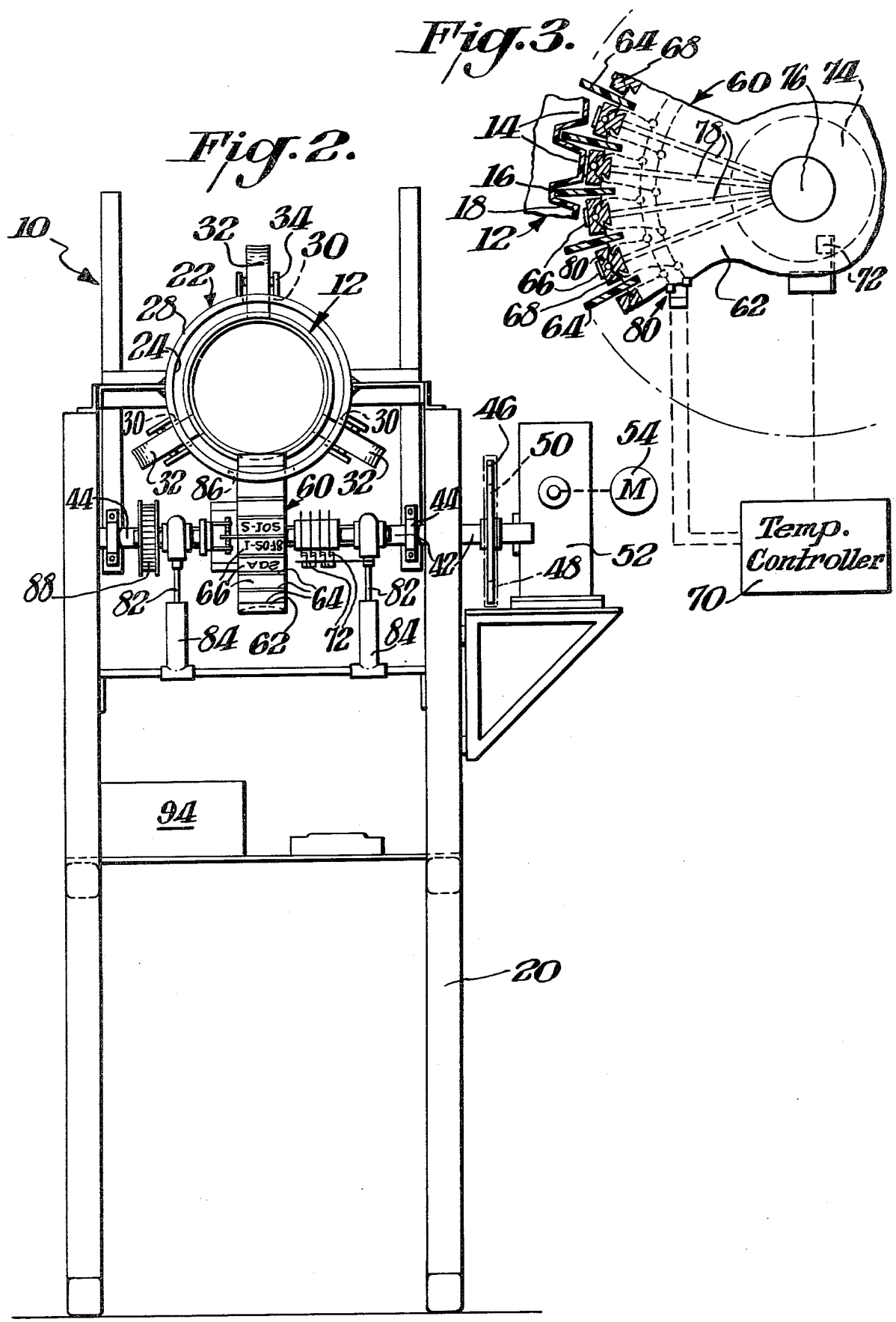

IMPRINTING MACHINE

BACKGROUND OF THE INVENTION

The present invention relates to an imprinting machine, and more particularly to a machine for imprinting indicia on thermoplastic corrugated tubing as the tubing moves along its path of travel.

Generally the machinery for manufacturing thermoplastic corrugated tubing comprises an extruder having an annular die at the free end thereof for producing a hollow smooth-walled cylindrical extrudate. The smooth-walled extrudate is then fed into a continuously moving corrugator comprising a plurality of mold sections that mate with each other to form the molding zone of the corrugator. Air pressure is utilized to blow the soft, smooth-walled extrudate onto the configured mold surfaces of the corrugator to thereby form the corrugations in the tubing product. The tubing is then cooled, perforated if desired, and coiled or cut into lengths. The perforations may be in the form of slotted openings when the tubing is to be used for drainage purposes, or circular openings may be provided for septic leach bed applications.

It is desirable to provide the tubing with identifying indicia concerning such information as the day and year of manufacture, the particular location of manufacture, material specifications, etc. Such information is useful to the manufacturer and in some cases at least some of the above information may be required by local, state and/or federal agencies. For example, the Bureau of Reclamation requires that every ten feet of corrugated tubing be marked with the plant of manufacture, date, shift and lot number. Obviously such information is always changing and marking machinery capable of easy change of the indicia is necessary.

SUMMARY OF THE INVENTION

Accordingly, it is an object of the present invention to provide a machine for imprinting indicia on thermoplastic corrugated tubing which is simple to build and easy to operate.

Another object of the present invention is a machine for imprinting indicia on corrugated tubing wherein indicia is easily changed.

In accordance with the present invention, a machine for imprinting indicia on thermoplastic corrugated tubing comprises a framework with guiding structure connected thereto for guiding the corrugated tubing along a predetermined path of travel. Motivating structure connected to the framework is constructed and arranged to move the tubing along its path of travel. Imprinting structure mounted on the framework adjacent the path of travel of the tubing is selectively moved into and out of engagement with the exterior surface of the tubing. The imprinting structure includes a print wheel with spaced apart teeth at the periphery thereof arranged to mesh with the corrugated tubing when the imprinting structure is in engagement therewith. Conductive print type are releasably secured to the print wheel at the periphery thereof. The imprinting structure also includes a mechanism for heating the print type and an arrangement for selectively shifting the print wheel into engagement with the exterior surface of the corrugated tubing as it moves along its path of travel so that the heated print type softens the thermoplastic to thereby heat stamp the indicia of the type onto the corrugated tubing.

The motivator may include at least one pulling wheel having spaced apart teeth at the periphery thereof arranged for mating engagement with the corrugated tubing. Wheel mounts connect the pulling wheel to the framework and gearing is provided for rotating the pulling wheel. Preferably, the print wheel and the pulling wheel have substantially the same diameter. The print wheel is connected to the pulling wheel for movement therewith so that the preferable speed of each wheel is substantially the same.

The structure for guiding the tubing along its path of travel includes at least one guide tube through which the corrugated tubing passes. Openings are provided in the guide tube, and spaced apart guide wheels mounted on the tube extend through the openings into engagement with the exterior surface of the tubing. Preferably, the arrangement for selectively shifting the print wheel into engagement with the corrugated tubing comprises air cylinder and piston structure mounted between the print wheel and the framework with a timer for activating and deactivating the air cylinder and piston.

The conductive print type are heated by a plurality of heater cartridges releasably secured to the print wheel at the periphery thereof. A temperature controller is provided for maintaining the temperature of the heater cartridges within a predetermined range.

BRIEF DESCRIPTION OF THE DRAWING

Novel features and advantages of the present invention in addition to those described above will become apparent to those persons skilled in the art from a reading of the following detailed description in conjunction with the accompanying drawing wherein:

FIG. 2 is an end elevational view of the imprinting machine shown in FIG. 1; and FIG. 3 is a partial sectional view illustrating the print wheel of the imprinting machine of FIGS. 1 and 2 with the wheel in engagement with the exterior surface of thermoplastic corrugated tubing.

DETAILED DESCRIPTION OF THE INVENTION

Figure 1:
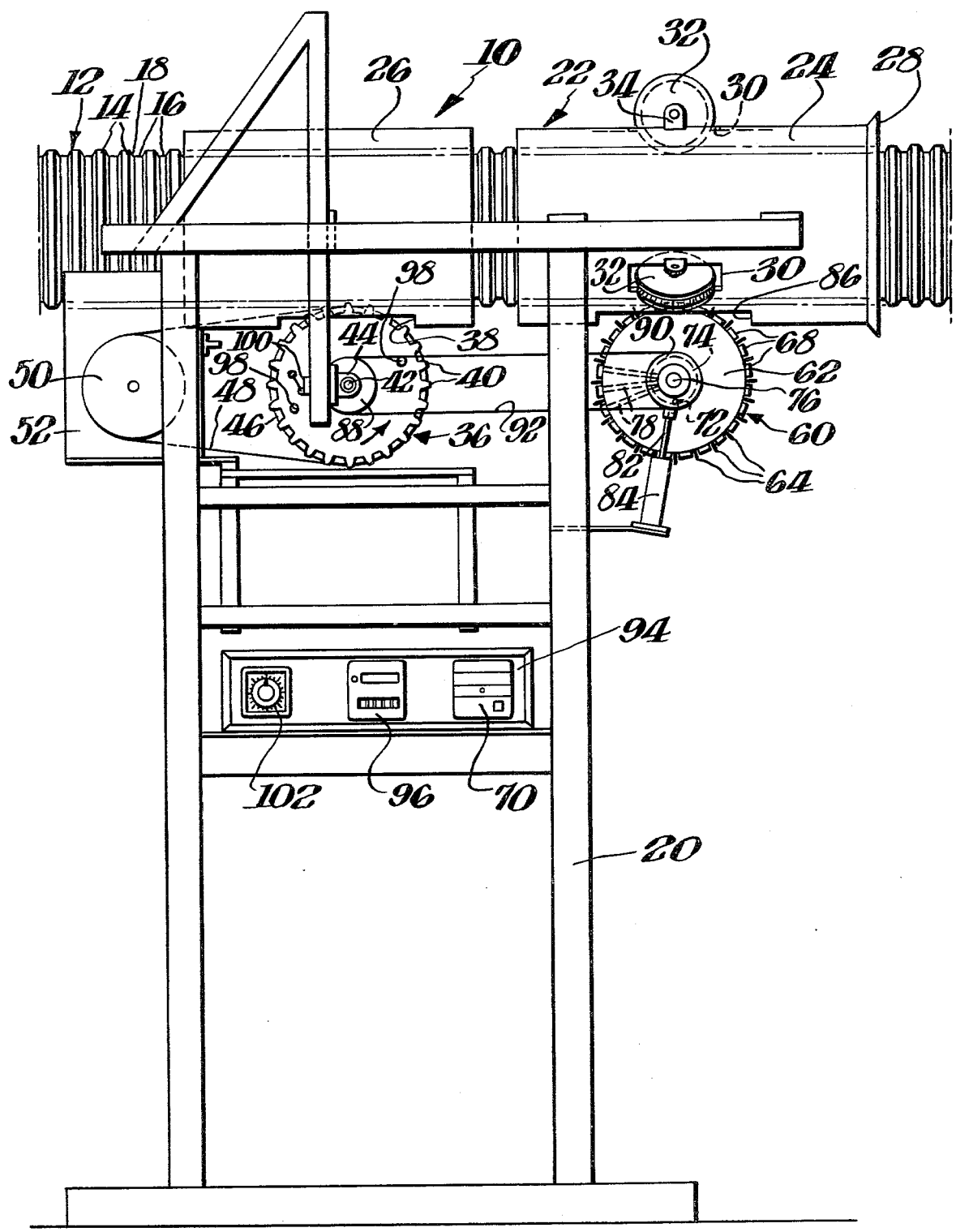
FIG. 1 is a side elevational view of an imprinting machine according to the present invention.

Referring in more particularity to the drawing, FIGS. 1-3 illustrate a machine 10 for imprinting indicia on thermoplastic corrugated tubing 12. As is well known, the corrugated tubing 12 comprises a plurality of alternating annular peaks 14 and valleys 16 interconnecting by side walls 18. Preferably, the indicia is imprinted upon the peak portions 14 of the corrugated tubing, as explained more fully below.

The machine 10 comprises a main framework 20 which functions to support the various components which cooperate in imprinting indicia on the thermoplastic corrugated tubing. A tube guiding arrangement 22 is secured to the upper portion of the framework 20 to guide the corrugated tubing 12 along a predetermined path of travel. Generally, the tube guiding arrangement functions to control the movement of the tubing through the machine in both the horizontal and vertical directions. The structure for guiding the tubing 12 along its path of travel includes a pair of guide tubes 24,26 in alignment with each other and dimensioned so that the tubing freely passes through the tubes. The front tube 24 has a flared entrance end 28 and three openings 30 are provided in the mid-section of the tube. Three guide wheels 32 are mounted on the tube 24 by mounting structure 34 so that the guide wheels extend through the openings 30 in the tube. These wheels are arranged so that the peripheries thereof engagingly support the tubing 12 as it moves through the tube 24. As best shown in FIG. 2, the guide wheels 34 are located at the 12:00, 4:00 and 8:00 o'clock positions.

The tubing 12 is pulled along its path of travel through the guiding structure by a motivating arrangement having a pulling wheel 36 as its principal component. The pulling wheel 36 is mounted to the framework 20 at a position directly below the path of travel of the corrugated tubing 12 and actually extends through an opening 38 in the guide tube 26. The periphery of the pulling wheel 36 includes teeth 40 which are dimensioned so that they complement the tubing and are in meshing engagement therewith. Hence, as the pulling wheel 36 is caused to rotate in a counterclockwise direction as viewed in FIG. 1, the teeth 40 mesh with the corrugations of the tubing 12 to thereby pull it along its path of travel through the guiding system.

The pulling wheel 36 is fixed to a shaft 42 which is journaled to the framework 20 by a pair of pillow blocks 44. A sprocket 46 on the shaft is connected by chain 48 to a suitable drive including a sprocket 50, a gear reduction box 52, and a motor 54. The motor 54 is connected to the input of the gear reduction box 52 which causes the output shaft of the box to rotate. With the sprocket 50 connected to the output shaft and chained to the sprocket 46, the pulling wheel rotates when the motor 54 is energized.

Imprinting structure 60 is mounted on the framework 20 of the machine 10 adjacent the path of travel of the tubing 12 for selective movement into and out of engagement with the exterior of the tubing. The imprinting structure 60 includes a print wheel 62 having spaced apart teeth 64 at the periphery thereof arranged to mesh with the corrugated tubing when the wheel is in engagement therewith. The teeth 64 function to index and align the print wheel 62 with respect to the corrugated tubing 12, as best shown in FIG. 3. Conductive print type 66 are releasably secured to the print wheel at the periphery thereof. The type are located between the teeth 64 and may extend over the entire periphery of the print wheel. Alternatively, the print type may only be located at four or five positions between adjacent teeth 64 on the wheel 62.

The print type are heated by heater cartridges 68 releasably secured to the print wheel 62. The cartridges are simply dimensioned to slide into appropriately dimensioned slots in the print wheel. In the embodiment of the invention shown in FIG. 3, the heater cartridges 68 carry the type 66 at the exterior surface thereof and the type and cartridge are inserted and removed as a single unit. Alternatively, the type 66 may be separate from its associated heater cartridge 68. For example, the heater cartridge may be cylindrical and dimensioned to fit within a cylindrical opening close to the exterior of the print wheel. The separate type could then be releasably secured at the periphery of the print wheel.

A temperature controller 70 maintains the temperature of the heater cartridges 68 within a predetermined range, for example 315° F. to 320° F. Energy is supplied to heat the cartridges 68 by the slip ring brushes 72 and slip rings 74 connected to rotate with the print wheel. In this regard, both the print wheel 62 and the slip rings 74 are connected to a shaft 76 so that rotation of that shaft causes both the slip rings and the print wheel to rotate. The power source is connected to the slip ring brushes 72 and power therefrom is then transmitted to the slip rings 74 and in turn to the heater cartridges 68 via suitable connectors 78 extending between slip rings 74 and the cartridges 68. A thermal couple device 80 connected to the controller 70 senses the temperature of the cartridges 68 so that each cartridge is maintained within the desired temperature range.

The print wheel 62 is selectively shifted into and out of engagement with the exterior surface of the corrugated tubing 12 by a pair of pistons 82 and air cylinders 84. The piston cylinders are interconnected between the framework 20 of the machine and the shaft 76 which carries the print wheel 62. Activation of the air cylinders 84 moves the print wheel 62 into engagement with the tubing 12. When this occurs the print wheel extends into and through an opening 86 in the lower part of the guide tube 24.

The print wheel rotates at the same peripheral speed as the pulling wheel 36. In this regard the driven shaft 42 for the pulling wheel 36 carries a timing wheel 88 and a similar wheel 90 is carried by the shaft 76 for the print wheel 62. A timing belt 92 interconnects the wheels 88, 90 so that they rotate at the same peripheral speed. With the diameters of the pulling wheel and the print wheel being substantially the same, the peripheral speed of each wheel is also substantially the same.

An instrument panel 94 connected to the framework 20 carries the temperature controller 70 which functions to set and hold the temperature of the heater cartridges 68, as explained above. The panel 94 also includes an electronic counter 96 which counts the number of feet of tubing passing through the machine 10. Generally, the counter includes two equally spaced apart set screws 98 on the pulling wheel that engage a stationary microswitch 100 as the pulling wheel rotates. For each revolution of the pulling wheels, two feet of tubing are pulled through the machine 10 and for each such revolution the set screws 98 generate two pulses. The electronic counter 96 counts these pulses and when the desired length of tubing has passed through the machine the air cylinders 84 are activated to imprint the tubing. For example, after ten pulses are counted, ten feet of tubing has passed through the machine, and the printing operation can then be accomplished. Continuing, the instrument panel 94 includes a timer 102 that functions to set the time the print wheel is in contact with the tubing.

In operation, appropriate print type 66 are positioned on the exterior of the print wheel 62. One line of print type may indicate the manufacturer, another line the plant location, another line the date of manufacture, another line the shift number, and another line the material specification code. Once the type has been set and the temperature of the heater cartridges reaches the set range, the imprinting machine is ready for operation. Tubing 12 is then threaded through the guiding system 22 and the pulling wheel 36 is energized so that it functions to pull tubing 12 along its predetermined path of travel through the machine. As explained above, as the pulling wheel 36 rotates, pulses are generated through the interaction of the set screws 98 and the stationary microswitch 100. The geometry of the pulling wheel 36 is such that each generated pulse is the equivalent of one foot of tubing passing through the machine 10. Assuming the electronic counter 96 is set for ten pulses, after ten pulses are mounted the air cylinders 84 are energized which forces the print wheel 62 into engagement with the exterior surface of the corrugated tubing 12. The teeth 64 at the periphery of the print wheel enter into the valleys 16 of the tubing 12 to thereby position the print type 66 in alignment with the peak portions 14 of the corrugations. The heated print type softens the thermoplastic material to thereby heat stamp the indicia of the type onto the tube. During the heat stamping of the type into the thermoplastic material, the uppermost guide wheels 32 function as a reactive surface in direct alignment with the print wheel 62. The other guide wheels 32 are also in vertical alignment with the print wheel and the uppermost guide wheel. This arrangement prevents horizontal and vertical shifting of the tubing during the imprinting operation. It is preferred that the print wheel make at least one complete revolution during each printing cycle and the timer 102 is appropriately set to accomplish this objective. Upon completion of the time the print wheel is in contact with the tubing, the air cylinders 84 are de-energized thereby causing the print wheel to move away from the tubing. The entire cycle of operaion is then repeated.

What is claimed is:

1. A machine for imprinting indicia on thermoplastic corrugated tubing having alternating peaks and valleys comprising a framework, means on the framework for guiding corrugated tubing along a predetermined path of travel, motivating means connected to the framework constructed and arranged to continuously move the tubing along its path of travel, and imprinting means mounted on the framework adjacent the path of travel of the tubing for selective movement into and out of engagement with the exterior surface of the tubing, the imprinting means including a print wheel with spaced apart teeth at the periphery thereof arranged to mesh with the valleys of the corrugated tubing when the print wheel is in engagement therewith, conductive print type releasably secured to the print wheel at the periphery thereof between at least some of the spaced apart teeth, means for heating the print type, and means for selectively shifting the print wheel into engagement with the exterior surface of the corrugated tubing as it moves along its path of travel whereby the heated print type softens the thermoplastic of the peaks to thereby heat stamp the indicia of the type onto the corrugated tubing.

2. A machine for imprinting indicia on thermoplastic corrugated tubing as in claim 1 wherein the motivating means includes at least one pulling wheel having spaced apart teeth at the periphery thereof arranged for mating engagement with the corrugated tubing, wheel mounts connecting the pulling wheel to the framework, and means for rotating the pulling wheel.

3. A machine for imprinting indicia on thermoplastic corrugated tubing as in claim 2 wherein the print wheel and the pulling wheel have substantially the same diameter, and means connecting the print wheel to the pulling wheel for movement therewith so that the peripheral speed of each wheel is substantially the same.

4. A machine for imprinting indicia on thermoplastic corrugated tubing as in claim 1 wherein the means for guiding the tubing along its path of travel includes at least one guide tube through which the corrugated tubing passes, openings in the guide tube, and spaced apart guide wheels mounted on the tube and extending through the openings therein into engagement with the exterior surface of the corrugated tubing.

5. A machine for imprinting indicia on thermoplastic corrugated tubing as in claim 1 wherein the means for selectively shifting the print wheel into engagement with the corrugated tubing comprises air cylinder and piston structure mounted between the print wheel and the framework, and timer means for activating and deactivating the air cylinder and piston structure.

6. A machine for imprinting indicia on thermoplastic corrugated tubing as in claim 1 wherein the means for heating the print type includes a plurality of heater cartridges releasably secured to the print wheel at the periphery thereof, and a temperature controller for maintaining the temperature of the cartridges within a predetermined range.

* * * * *